Oct. 21, 1958  G. CLARK  2,857,110
STATOR FOR GRINDING, PULVERISING AND CRUSHING MILLS
Filed Dec. 6, 1955
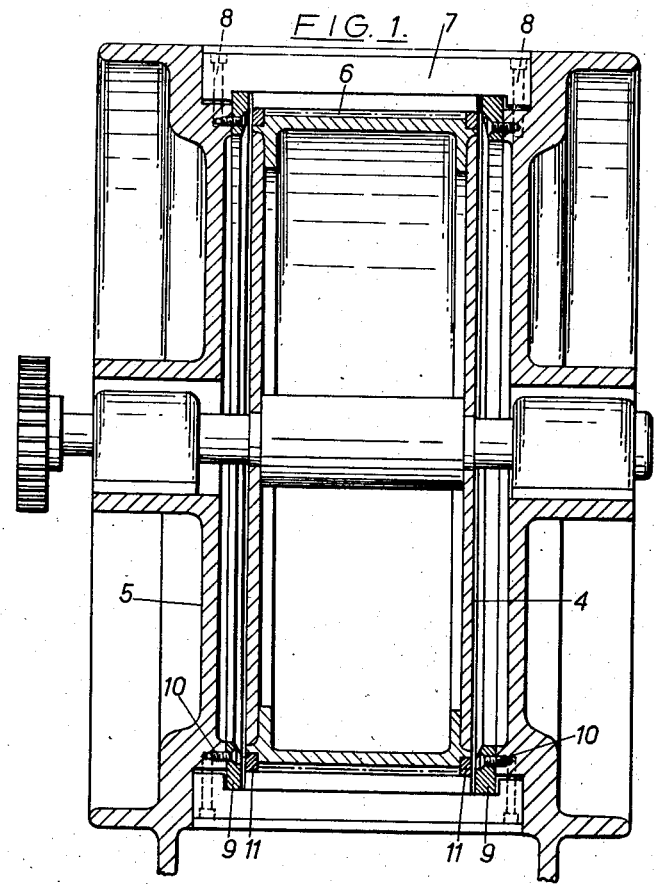
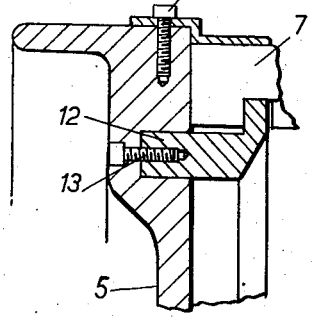
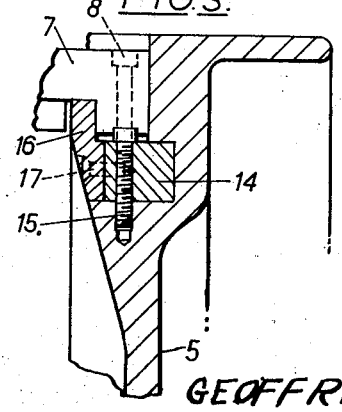
Inventor
GEOFFREY CLARK
By Mead, Browne, Schuyler & Beveridge
Attorneys

United States Patent Office 2,857,110
Patented Oct. 21, 1958

2,857,110

STATOR FOR GRINDING, PULVERISING AND CRUSHING MILLS

Geoffrey Clark, Hull, England, assignor of one-half to Unipulver Limited, Hull, England, a British company Application December 6, 1955, Serial No. 551,426

Claims priority, application Great Britain December 8, 1954

2 Claims. (Cl. 241—242)

This invention relates to grinding, pulverising and crushing mills of the type in which a rotor carrying a series of cutting or grinding blades around its outer periphery is mounted for rotation within a stator provided with a complementary series of blades adapted to co-operate with those of the rotor.

When mills of the type referred to are being used to grind materials of an extremely abrasive nature, wear may take place between the ends of the rotor blades or the rotor edge and the edges of the frame spigots carrying the ends of the stator blade assemblies.

The replacement of worn rotor and stator blades is a relatively simple matter, and provision for such wear is always made when constructing these mills. The wear of those parts of the stator frame adjacent the blade ends is, however, a more serious matter, as the clearances between the rotor edge and/or blade ends and the frame spigots tend to increase during the life of the mill and may allow the pulverulent material to become unevenly spaced across the faces of the grinding blades with consequent loss of grinding efficiency.

It is an object of the present invention to overcome this disadvantage and so increase the efficiency of such machines over a period of time.

According to the present invention the stator of a grinding, pulverising or crushing mill is provided with one or more replaceable elements in a region or regions of the stator framework subject to wear. The replaceable elements may be annular in shape, and may be mounted in or recessed into the stator framework in positions adjacent to the end faces of the rotor blades or adjacent to the edges of the rotor periphery.

The annular elements may be cast from the same metal as the stator framework, but are preferably formed from a metal exhibiting good wearing properties.

The replaceable elements must be rigidly connected to the main stator frame and this may be effected by bolting or by dovetailing in suitable slots formed in the stator frame.

To combat wear, the rotor edges may also be provided with replaceable elements, for example annular elements recessed into the rotor edges and bolted to the rotor.

The invention will now be further described with reference to the accompanying drawings wherein like numbers refer to like parts and in which:

Fig. 1 is a sectional view of a grinding, pulverising or crushing mill according to the invention, and, Each of Figs. 2 and 3 is a fragmentary sectional view illustrating a modification of the construction shown in Fig. 1.

In Fig. 1, a rotor 4 is rotatably mounted in a stator framework 5 and carries blades 6 on its outer periphery. Stator blade assemblies 7 are secured to stator framework 5 by means of bolts 8. Annular elements 9 are secured to the stator framework by means of bolts 10, these annular elements serving to support the stator blade assemblies 7 and replacing the normal spigots formed integral with the stator framework. Annular elements 11 are recessed into the edges of the periphery of the rotor and secured thereto by means of bolts (not shown).

In Fig. 2, annular elements 12 are partially recessed into the stator framework 5 and secured therein by means of bolts 13. Stator blade assemblies 7 are partially supported by elements 12.

In Fig. 3, the annular elements consist of two parts. An inner annular element 14 is recessed within the stator framework 5 and secured thereto by means of bolts 15 while an outer annular element 16 is secured to element 14 by means of bolts 17. Element 16 supports stator blade assembly 7, which is secured to element 14 by means of bolts 8.

I claim:

1. In a grinding mill of the type comprising a stator framework, a closed drum rotatably mounted in said stator framework, a plurality of rotor blades mounted upon the outer peripheral surface of the drum, parallel to its axis of rotation, a plurality of stator blades mounted within said stator framework parallel to the axis of rotation of the drum and arranged to give a uniform annular gap between said stator blades and said rotor blades; two annular elements concentric with the axis of rotation of the drum and fixed in said stator framework one on each side of and adjacent to the peripheral surface of the drum and two annular elements concentric with the axis of rotation of the drum and recessed into the edge of the periphery of the drum, one on each side thereof.

2. A grinding mill as set forth in claim 1 wherein said annular elements fixed in said stator framework are partially recessed into grooves in said stator framework.

References Cited in the file of this patent

UNITED STATES PATENTS

| | | |
|---|---|---|
| 687,024 | Heid | Nov. 19, 1901 |
| 2,219,720 | Clark | Oct. 29, 1940 |
| 2,414,361 | Cowles | Jan. 14, 1947 |
| 2,463,843 | Wright | Mar. 8, 1949 |
| 2,583,319 | Brake | Jan. 22, 1952 |